United States Patent
Spahic

(10) Patent No.: US 10,749,345 B2
(45) Date of Patent: Aug. 18, 2020

(54) METHOD AND INSTALLATION FOR STABILIZING A FREQUENCY IN AN AC VOLTAGE GRID

(71) Applicant: SIEMENS AKTIENGESELLSCHAFT, Munich (DE)

(72) Inventor: Ervin Spahic, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 15/895,137

(22) Filed: Feb. 13, 2018

(65) Prior Publication Data

US 2018/0233915 A1 Aug. 16, 2018

(30) Foreign Application Priority Data

Feb. 13, 2017 (DE) .................. 10 2017 202 209

(51) Int. Cl.
*H02J 3/32* (2006.01)
*H02J 7/00* (2006.01)
(Continued)

(52) U.S. Cl.
CPC ............... *H02J 3/32* (2013.01); *H02J 3/06* (2013.01); *H02J 3/18* (2013.01); *H02J 7/0013* (2013.01); *H02J 7/345* (2013.01)

(58) Field of Classification Search
None
See application file for complete search history.

(56) References Cited

U.S. PATENT DOCUMENTS 9,130,477 B2 9/2015 Marquardt
2012/0243282 A1 9/2012 Marquardt
(Continued)

FOREIGN PATENT DOCUMENTS

DE 102009057288 A1 6/2011
WO 2007102758 A1 9/2007
(Continued)

OTHER PUBLICATIONS

Molina, M.G., et al.: "Dynamic modeling and control design of DSTATCOM with ultra-capacitor energy storage for power quality improvements"; IEEE/PES Transmission and Distribution Conference and Exposition: Latin America; Bogota; pp. 1-8; doi: 10.1109/TDCLA.2008.4641872.; 2008.

(Continued)

*Primary Examiner* — Jared Fureman
*Assistant Examiner* — Aqeel H Bukhari
(74) *Attorney, Agent, or Firm* — Laurence Greenberg; Werner Stemer; Ralph Locher

(57) ABSTRACT

A method for stabilizing a frequency in an AC voltage grid includes exchanging active power between the AC voltage grid and an energy storage device of a compensation installation in which the energy storage device is connected to the AC voltage grid. An electrical power is transmitted in an interconnector that connects the AC voltage grid to a further AC voltage grid. The electrical power is measured. The exchange of the active power is initiated by a control device of the compensation installation depending on a direction of the transmitted power. An installation for stabilizing an AC voltage grid can be used, in particular, to carry out the method.

12 Claims, 3 Drawing Sheets

(51) Int. Cl.
    *H02J 3/18*     (2006.01)
    *H02J 3/06*     (2006.01)
    *H02J 7/34*     (2006.01)

(56) References Cited

U.S. PATENT DOCUMENTS

| | | | |
|---|---|---|---|
| 2013/0234521 A1* | 9/2013 | Eom | H02J 3/18 307/66 |
| 2014/0183961 A1 | 7/2014 | Schrock et al. | |
| 2014/0365027 A1 | 12/2014 | Namba et al. | |
| 2016/0211667 A1* | 7/2016 | Knaak | H02J 3/32 |
| 2017/0176965 A1 | 6/2017 | Martin Lloret et al. | |
| 2017/0335657 A1* | 11/2017 | Abney | E21B 43/26 |
| 2019/0036335 A1* | 1/2019 | Hui | H02J 3/32 |

FOREIGN PATENT DOCUMENTS

| | | |
|---|---|---|
| WO | 2015075372 A1 | 5/2015 |
| WO | 2015113637 A1 | 8/2015 |

OTHER PUBLICATIONS

Abdullah, M.A., et al.: "An Effective Power Dispatch Control Strategy to improve Generation Schedulability and Supply Reliability of a Wind Farm Using a Battery Energy Storage System"; IEEE Transactions on Sustainable Energy; vol. 6; Nr. 3; pp. 1093-1102; Jul. 2015. doi: 10.1109/TSTE.2014.2350980.; 2015.

* cited by examiner

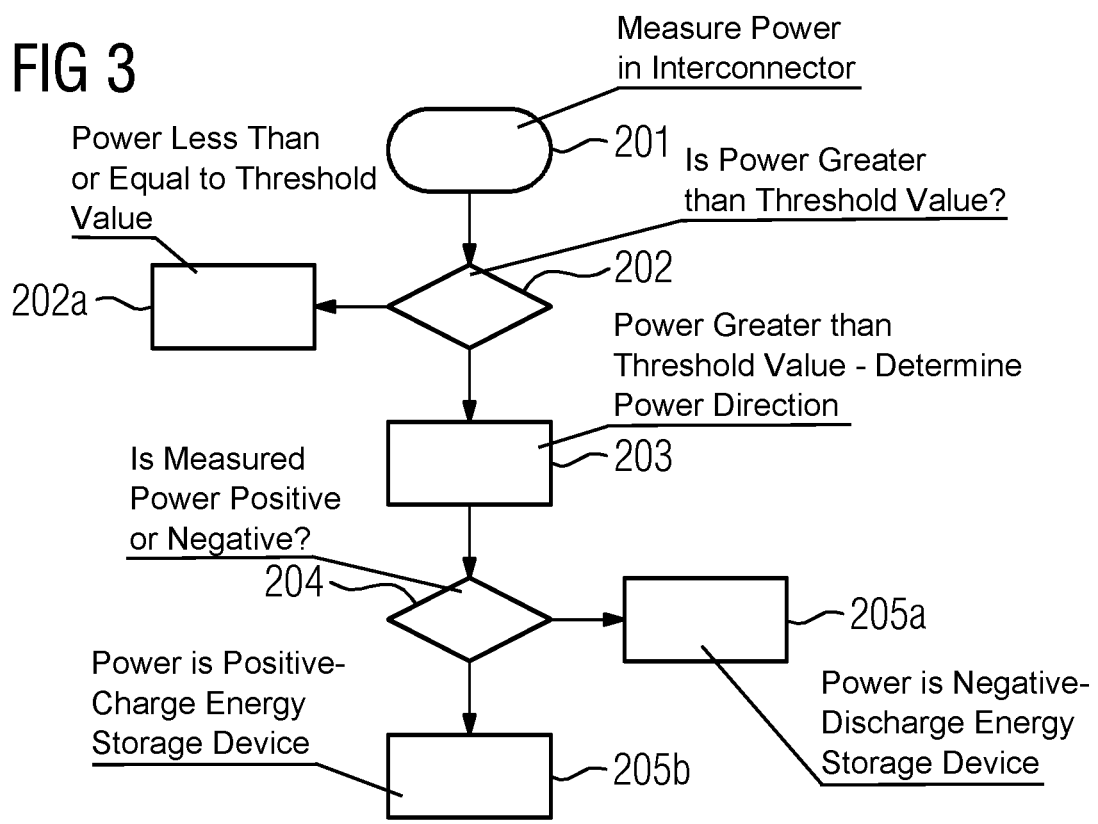

METHOD AND INSTALLATION FOR STABILIZING A FREQUENCY IN AN AC VOLTAGE GRID

CROSS-REFERENCE TO RELATED APPLICATION

This application claims the benefit, under 35 U.S.C. § 119, of German Patent Application DE 10 2017 202 209.4, filed Feb. 13, 2017; the prior application is herewith incorporated by reference in its entirety.

BACKGROUND OF THE INVENTION

Field of the Invention

The invention relates to a method and an installation for stabilizing a frequency in an AC voltage grid, in which active power is exchanged between the AC voltage grid and an energy storage device of a compensation installation, and the energy storage device is connected to the AC voltage grid.

Such a method is known from International Publication WO 2007/102758 A1. That document describes a power compensation installation that can exchange both reactive power and active power with the AC voltage grid. The known power compensation installation includes a converter, that is also referred to as a STATCOM (Static Var Compensator), which is connected on the AC voltage side to the AC voltage grid by a transformer. A capacitance is connected in a parallel circuit with the DC voltage side of the converter. The power compensation installation further includes an energy storage device in the form of batteries. The energy storage device is connected in parallel with the capacitance.

Exchanging the active power between the energy storage device and the AC voltage grid can influence the frequency in the AC voltage grid. If the AC voltage grid is, for example, an energy supply grid, the fundamental frequency of an AC voltage in the AC voltage grid is usually 50 Hz or 60 Hz. That frequency is intended to remain as constant as possible over time. However, the frequency can also be subjected to temporary fluctuations, for example due to a changed power consumption by connected loads and/or a changed power delivery by connected sources.

The frequency can then be stabilized by the method mentioned at the outset by virtue of the compensation installation being induced to draw the active power in the event of an increase in frequency in the AC voltage grid (overfrequency) and being induced to deliver the active power in the event of a decrease in frequency (underfrequency).

The energy storage device generally has a limited active power capacity. The active power can usually be drawn or delivered over a period of not more than a few seconds. As a result, the problem can arise in which the energy storage device can already be completely full in the case of overfrequency or can be completely empty in the case of underfrequency, with the result that the above method cannot be carried out successfully.

SUMMARY OF THE INVENTION

It is accordingly an object of the invention to provide a method and an installation for stabilizing a frequency in an AC voltage grid, which overcome the hereinafore-mentioned disadvantages of the heretofore-known methods and installations of this general type and which are as reliable as possible.

With the foregoing and other objects in view there is provided, in accordance with the invention, a method for stabilizing a frequency in an AC voltage grid, in which active power is exchanged between the AC voltage grid and an energy storage device of a compensation installation, the energy storage device is connected to the AC voltage grid, an electrical power is measured, the electrical power is transmitted in an interconnector that connects the AC voltage grid to a further AC voltage grid, and the exchange of the active power is initiated by a control device of the compensation installation depending on a direction of the transmitted power.

The invention is based on the knowledge that the interconnector is a critical path of the AC voltage grid. The interconnector can expediently be a HVDC or a HVAC connection (high-voltage direct-current connection or high-voltage alternating-current connection). Two supply grids are often connected to one another by such connections. Large frequency fluctuations are produced, for example, in the event of the interconnector failing. In addition, the further AC voltage grid can behave as a particularly large load or source of electrical power. The power transmitted in the interconnector can therefore serve as a particularly suitable indicator of the frequency response. This indicator can be used to prepare the energy storage devices for a future action, for example for a failure of the interconnector.

If, for example, a positive transmitted power is measured, a drawing of active power is initiated in such a way that the energy storage device is charged. In the case of a negative transmitted power, a delivery of power is initiated in such a way that the energy storage device is discharged accordingly. In this case, a measured transmitted power is referred to as positive when electrical power is transmitted from the further AC voltage grid to the AC voltage grid. Accordingly, a measured transmitted power is referred to as negative when electrical power is transmitted from the AC voltage grid to the further AC voltage grid.

The energy storage device is preferably fully discharged or fully charged depending on the direction of the flow of power. In particular, the energy storage device can be fully charged in the case of a positive measured power and can be fully discharged in the case of a negative measured power. In this way, a maximum possible availability for power compensation is produced and a particularly reliable method is achieved.

In accordance with one embodiment of the invention, the active power drawn by the compensation installation is stored in individual storage elements of the energy storage device that are connected in series and/or in parallel. In this way, the active power, or the electrical energy, is distributed over individual storage elements. The storage elements are suitably dimensioned for a voltage of over 1 kV. The distribution of the active power over the storage elements permits a particularly effective and at the same time cost-effective active power exchange with the AC voltage grid.

The active power is preferably drawn or delivered only when the magnitude of the measured power exceeds a prescribed threshold value. This prevents the charging or discharging of the energy storage device from being triggered as early as at low or insignificant transmitted powers. This increases the reliability of the method and reduces the loading on the energy storage device.

The invention further relates to an installation for stabilizing an AC voltage grid, including a compensation installation for exchanging active power and reactive power with the AC voltage grid, in which the active power can be exchanged between the AC voltage grid and an energy storage device of the compensation installation, and the energy storage device is connected to the AC voltage grid.

Such an installation is known from the above-mentioned International Publication WO 2007/102758 A1.

The object of the invention is to provide such an installation that can ensure the most reliable possible stabilization of the frequency in the AC voltage grid.

With the objects of the invention in view, there is also provided a measuring apparatus for measuring an electrical power in an interconnector that connects the AC voltage grid to a further AC voltage grid, and a control device of the compensation installation which is configured to initiate the exchange of the active power between the compensation installation and the AC voltage grid depending on a direction of the measured power transmitted in the interconnector.

The most important advantages of the installation according to the invention emerge from the possibility of carrying out the method according to the invention described above.

The installation is expediently configured to exchange reactive power with the AC voltage grid. As a result, an active and reactive power compensation installation is provided by the installation. For this purpose, the installation can include intermediate capacitors (which can also be referred to as link capacitors) and controllable switches, with the result that reactive power can be exchanged with the AC voltage grid by a suitable control of the intermediate capacitors. In this case, the intermediate capacitors and the energy storage device are separate elements of the installation.

In accordance with one embodiment variant of the invention, the energy storage device includes a multiplicity of individual storage elements, which are connected to one another in series and/or in parallel. Such an energy storage device can be produced particularly cost-effectively, specifically while retaining a reliable exchange of the active power with the AC voltage grid.

The storage elements can in this case be embodied as supercaps (which are also referred to as supercapacitors), ultracapacitors or double-layer capacitors. Storage elements of this kind have a particularly high power density, with the result that they can be charged and discharged particularly quickly. The installation can thus react particularly quickly to frequency fluctuations in the AC voltage grid. The storage elements can furthermore be battery storage devices.

Since voltages of over 100 kV are usually used in the AC voltage grid, it is considered to be advantageous if the storage elements can establish a voltage of more than 1 kV at the terminals of the storage elements. A correspondingly high total voltage can be achieved by the series circuit of the storage elements.

In accordance with one embodiment of the invention, the compensation installation includes a converter having a plurality of converter arms, wherein each of the converter arms has a series circuit of semiconductor switching modules, and the energy storage device is connected in a parallel circuit with at least one of the converter arms. The converter is therefore a so-called modular multi-level converter (MMC). The MMC can have a three-phase structure, for example. In accordance with one embodiment variant, the MMC includes three converter phases each having two converter arms. Each converter phase extends between a positive and a negative DC voltage pole. The converter arms of a converter phase are connected to one another in series, wherein one AC voltage connection for connecting the MMC to a phase of the AC voltage grid is connected in each case between the converter arms. The energy storage device is connected in parallel with the converter phases between the positive and the negative DC voltage poles.

The semiconductor switching modules preferably each include semiconductor switches and an intermediate capacitor, which are interconnected with one another in a full-bridge module circuit. A full-bridge module circuit is distinguished in that two series circuits of two semiconductor switches are connected in parallel, wherein the intermediate capacitor is connected in parallel with the series circuits of the semiconductor switches. The full-bridge module circuit has two connection terminals, one of which is connected with a potential point between the semiconductor switches of the one series circuit and the other is connected with a potential point between the semiconductor switches of the other series circuit. A capacitor voltage dropped across the intermediate capacitor, a zero voltage or else the inverse capacitor voltage can be generated at the connection terminals of the semiconductor switching module.

In the context of the invention, all of the embodiment variants and features described above in connection with the method according to the invention can of course also be used, individually or in combination, in connection with the installation according to the invention (or vice versa).

Other features which are considered as characteristic for the invention are set forth in the appended claims.

Although the invention is illustrated and described herein as embodied in a method and an installation for stabilizing a frequency in an AC voltage grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a flow chart of an exemplary embodiment of a method according to the invention.

DETAILED DESCRIPTION OF THE INVENTION

Figure 1:
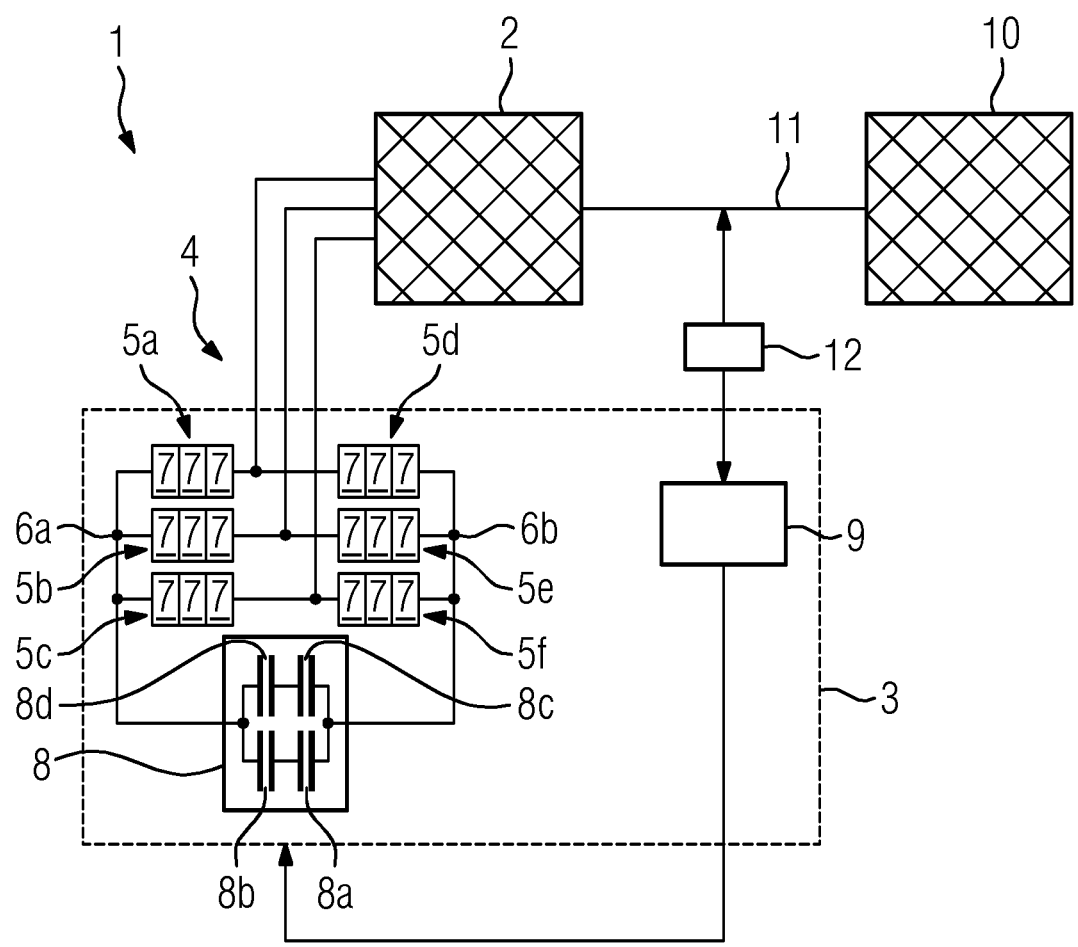
FIG. 1 is a block diagram of an exemplary embodiment of an installation according to the invention.

Referring now to the figures of the drawings in detail and first, particularly, to FIG. 1 thereof, there is seen an installation 1 for stabilizing a frequency in an AC voltage grid 2. The installation 1 includes a compensation installation 3, which has an AC voltage connection 4 for connection to the AC voltage grid 2. The compensation installation 3 can thus be connected on the AC voltage side to the AC voltage grid 2. The compensation installation includes six converter arms 5a-5f, which are connected to one another in a double-star circuit. The three converter arms 5a-c are connected to one another in a first star point 6a and the three converter arms 5d-f are connected to one another in a second star point 6b.

Figure 2:
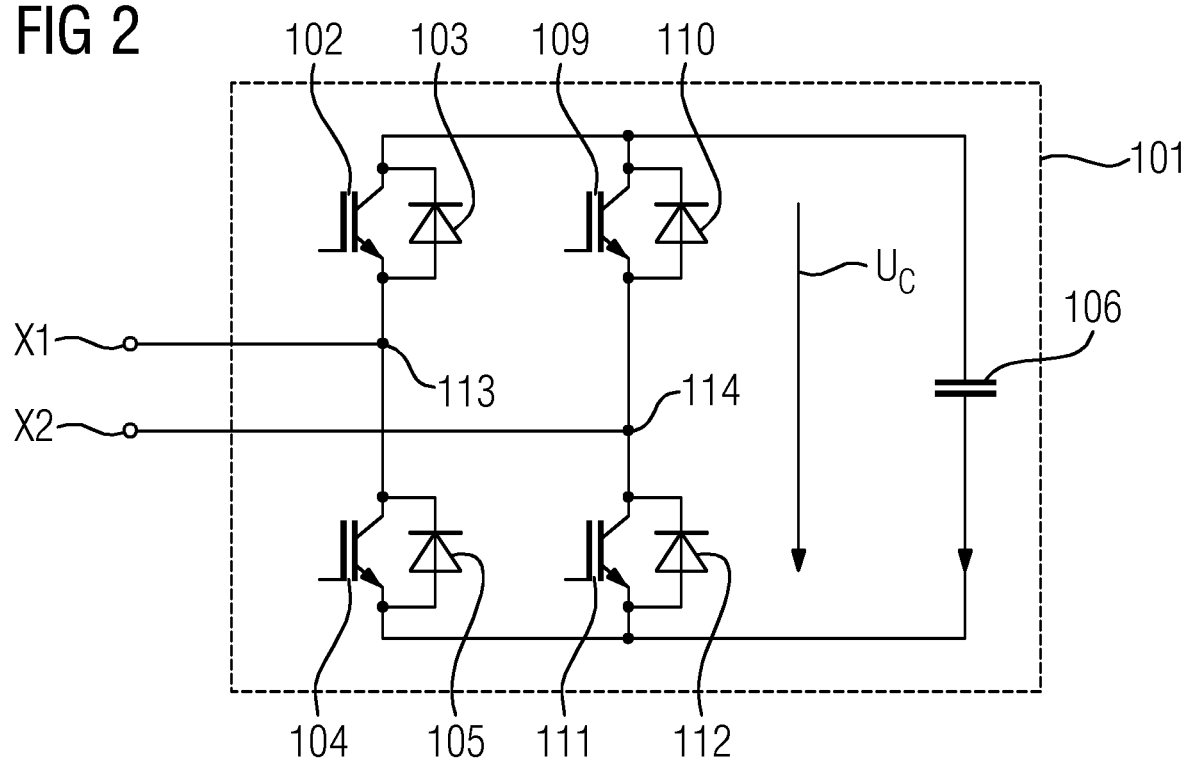
FIG. 2 is a schematic circuit diagram of an exemplary embodiment of a full-bridge module circuit.

Each converter arm 5a-f has a series circuit of semiconductor switching modules 7 (of identical construction in the exemplary embodiment of FIG. 1). FIG. 2 deals with the construction of the semiconductor switching modules 7 in more detail. In FIG. 1, only three semiconductor switching modules 7 are illustrated for reasons of clarity. However, the number of semiconductor switching modules is, in principle, arbitrary and can be adapted to the respective application.

The compensation installation 3 further includes an energy storage device 8, which is connected in parallel with the three converter phases. The energy storage device 8 includes a plurality of storage elements 8a-8d which, in the example illustrated, are connected in two parallel-connected series circuits. A control device 9 for regulating the compensation installation 3 permits control of the semiconductor switching modules 7 in such a way that an exchange of active power with the AC voltage grid 2 is made possible.

The AC voltage grid 2 is connected to a further AC voltage grid 10 by an interconnector 11. In the illustrated example, the interconnector 11 is an HVDC connection with a voltage of 320 kV. The voltages in the two AC voltage grids 2, 10 are each 380 kV AC. A measuring device 12 is configured to measure a power transmitted in the interconnector 11. The output side of the measuring device 12 is connected to the control device 9 in such a way that the compensation installation 3 is regulated by using the measured transmitted power. The power can be measured, for example, by current and voltage measurement.

One example of a semiconductor switching module 7 in the form of a full-bridge module circuit 101 is schematically illustrated in FIG. 2. The full-bridge module circuit 101 has a first semiconductor switch 102 in the form of an IGBT, with which a freewheeling diode 103 is connected in anti-parallel, and a second semiconductor switch 104 in the form of an IGBT, with which a freewheeling diode 105 is connected in anti-parallel. The forward direction of the two semiconductor switches 102 and 104 is in the same direction. The full-bridge module circuit 101 further includes a third semiconductor switch 109 in the form of an IGBT, with which a freewheeling diode 110 is connected in anti-parallel, and a fourth semiconductor switch 111 in the form of an IGBT, with which a freewheeling diode 112 is connected in anti-parallel. The forward direction of the two semiconductor switches 109 and 111 is in the same direction. The semiconductor switches 102 and 104 with the freewheeling diodes 103, 105 associated therewith thus form a series circuit, which is connected in parallel with a series circuit formed by the semiconductor switches 109, 111 and the associated freewheeling diodes 110 and 112. An intermediate capacitor 106 is connected in parallel with the two series circuits. A first connection X1 is disposed at a potential point 113 between the semiconductor switches 102, 104 and a second connection X2 is disposed at a potential point 114 between the semiconductor switches 109, 111.

The voltage dropped across the terminals X1, X2 can be generated by suitable control of the power semiconductors 102, 104, 109 and 111. That voltage corresponds to a voltage $U_c$ dropped across the intermediate capacitor 106, to a voltage dropped across the intermediate capacitor 106 but with the opposite polarity ($-U_c$) or to a voltage of zero.

The individual method steps of an exemplary embodiment of the method according to the invention are to be explained with reference to the flow chart of FIG. 3. The method can be carried out, for example, by the installation 1 illustrated in FIG. 1.

In a first method step 201, a power P transmitted in the interconnector 11 between the two AC voltage grids 2, 10 is measured.

In a second method step 202, a check is performed as to whether the magnitude |P| of the measured transmitted power P is greater than a predefined power threshold value X. If $|P|<=X$, no further action is taken, which is indicated by a block 202a.

If the magnitude of the measured transmitted power P is greater than the power threshold value X, the direction of the transmitted power P is determined in a third method step 203. In this case, a power transmitted from the AC voltage grid 2 to the further AC voltage grid 10 is denoted as negative and a power transmitted in the opposite direction is denoted as positive.

In a fourth method step 204, a check is performed as to whether there is a positive or a negative measured power P.

If there is a negative power, a full discharge of the energy storage device 8 of the compensation installation 3 is initiated in a fifth method step 205a. In this way, the energy storage device 8 is prepared for the event of overfrequency in the AC voltage grid 2.

If there is a positive power, a full charge of the energy storage device 8 of the compensation installation 3 is initiated in an alternative fifth method step 205b. In this way, the energy storage device 8 is prepared for the event of underfrequency in the AC voltage grid 2.

The invention claimed is:

1. A method for stabilizing a frequency in an AC voltage grid, the method comprising the following steps:
   providing a compensation installation having an energy storage device connected to the AC voltage grid;
   exchanging active power between the AC voltage grid and the energy storage device;
   measuring an electrical power being transmitted in an interconnector connecting the AC voltage grid to a further AC voltage grid; and
   using a control device of the compensation installation to initiate the exchange of the active power depending on a direction of the transmitted power.

2. The method according to claim 1, which further comprises fully discharging or fully charging the energy storage device depending on a direction of a flow of power.

3. The method according to claim 1, which further comprises storing the active power drawn by the compensation installation in individual storage elements of the energy storage device being connected at least one of in series or in parallel.

4. The method according to claim 1, which further comprises drawing or delivering the active power only when a magnitude of the measured power exceeds a prescribed threshold value.

5. The method according to claim 1, which further comprises using the exchange of the active power between the compensation installation and the AC voltage grid to stabilize the frequency in the AC voltage grid.

6. An installation for stabilizing an AC voltage grid, the installation comprising:
   a compensation installation for exchanging active power and reactive power with the AC voltage grid;
   said compensation installation including an energy storage device connected to the AC voltage grid for exchanging the active power between the AC voltage grid and said energy storage device;
   a measuring apparatus for measuring an electrical power in an interconnector connecting the AC voltage grid to a further AC voltage grid; and
   said compensation installation including a control device being configured to initiate the exchange of the active power between said compensation installation and the AC voltage grid depending on a direction of the measured electrical power transmitted in said interconnector.

7. The installation according to claim 6, wherein said energy storage device includes a multiplicity of individual storage elements being connected to one another in at least one of series or parallel.

8. The installation according to claim 7, wherein said storage elements are at least one of supercaps or battery storage devices.

9. The installation according to claim 7, wherein said storage elements have terminals, and said storage elements can establish a voltage of more than 1 kV at said terminals of said storage elements.

10. The installation according to claim 6, wherein said compensation installation includes a converter having a plurality of converter arms, each of said converter arms has a series circuit of semiconductor switching modules, and said energy storage device is connected in a parallel circuit with at least one of said converter arms.

11. The installation according to claim 10, wherein said semiconductor switching modules each include semiconductor switches and an intermediate capacitor being interconnected with one another in a full-bridge module circuit.

12. The installation according to claim 6, wherein the exchange of the active power between said compensation installation and the AC voltage grid stabilizes the frequency in the AC voltage grid.

\* \* \* \* \*